June 1, 1943.  J. B. HOOD  2,320,435
EXPANDING TOOL
Filed Oct. 9, 1941
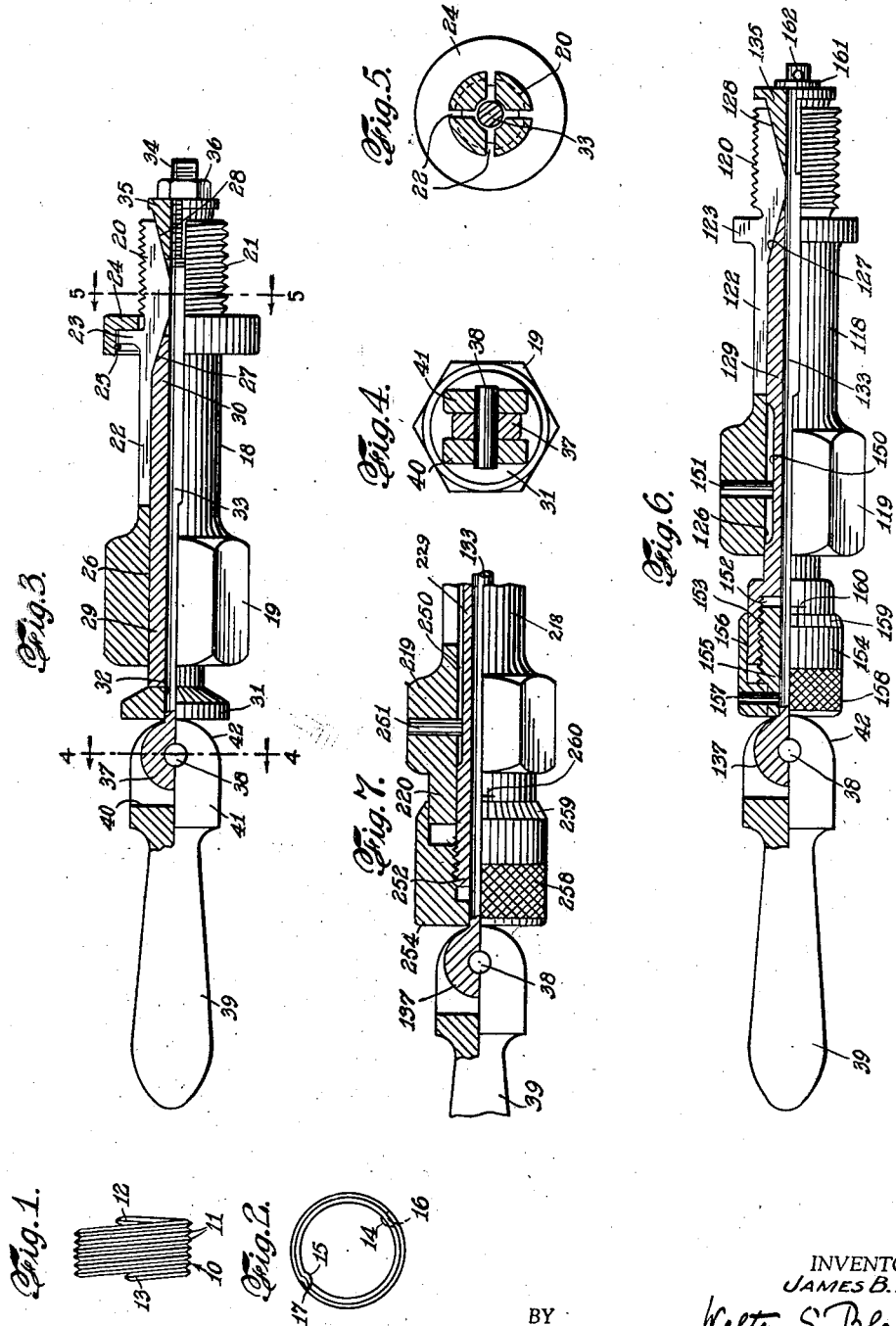
INVENTOR.
JAMES B. HOOD
BY Walter S. Bleston
ATTORNEY.

Patented June 1, 1943

2,320,435

UNITED STATES PATENT OFFICE 2,320,435

EXPANDING TOOL

James B. Hood, New York, N. Y., assignor to Aircraft Screw Products Company, Inc., Long Island City, N. Y., a corporation of New York Application October 9, 1941, Serial No. 414,327

4 Claims. (Cl. 81—15)

The present invention relates to a tool for securing wire coil inserts in the threading of a tapped hole. Wire coil inserts here in consideration are used in order to provide a boss of more or less soft material, as for example aluminum, with a hard and resistant internal threading which permits a stud to be repeatedly screwed in and out without injury to the thread convolutions in the boss. Screw connections of such kind are disclosed, e. g. in the U. S. Patent No. 2,150,876; however, I wish it to be understood that my invention is not limited to the use in connection with wire coils of the particular cross-section shown in the said patent.

In accomplishing a screw connection of the said type certain difficulties are frequently encountered since it happens that the external threading of a stud when being screwed into the insert engages only a short length of the latter, and that further turning of the stud causes a relative movement between insert and boss rather than between insert and stud. In other words, if e. g. in a cylinder of an internal combustion engine a wire coil insert is used in the tapped hole for a spark plug it occurs that the spark plug when being applied thereto catches only one or two convolutions of the insert and then turns the insert so as to screw the latter forward in the tapped hole and to urge the advancing end of the insert into the cylinder space. It is obvious that such happening may be the cause of severe damage.

It is the purpose of the present invention to overcome these difficulties by forcing the convolutions of the coil after its insertion into the thread grooves of the boss, and in certain cases I also shape the ends of the wire coil so that they can be anchored in the boss by expansion of the coil or at least of the end portions of the coil after its insertion. The present invention aims, therefore, to provide a tool with the aid of which the desired internal pressure in substantially radial direction can be easily exercised. The tool according to the invention comprises a body with a slotted threaded end which can be screwed into an insert of the mentioned type, and then expanded by internal wedging action of a member or members actuated from the other end of the tool.

Further details and objects of the invention will be apparent from the description given hereinafter and the accompanying drawing showing two embodiments thereof by way of example.

In the drawing:

Figs. 1 and 2 are a side elevation and a front view respectively of an insert of the mentioned type with ends adapted to be anchored in the boss after its insertion;

Fig. 3 is a side elevation, partly in section of an embodiment of the invention;

Figs. 4 and 5 are sections along lines 4—4 and 5—5 respectively of Fig. 3;

Fig. 6 is a side elevation, partly in section, of another embodiment of my invention, and Fig. 7 is a similar elevation of a modification thereof.

Referring now first to Figs. 1 and 2 of the drawing, 10 is an insert of the mentioned type whose wire is so coiled that the pitch of the convolutions 11 substantially corresponds to that of the threading of the tapped hole for which the insert is destined, and the diameter is preferably so selected that the wire springs into the thread grooves of the boss to which it is to be applied. The cross-section of the wire may either be diamond-shaped or it may have any other suitable or conventional cross-section. The ends 12 and 13 of the insert may have inward bends 14, 15 and may be provided with outwardly directed sharp points or edges 16, 17 which, however, should not substantially project beyond the outer periphery of the coil prior to its insertion as clearly shown in Fig. 2. Now, it will be apparent that if such coil of a hard metal is inserted in a tapped hole provided with a corresponding threading in a soft metal boss or nut, and if, then, the coil and/or particularly its ends are expanded from the interior, the convolutions of the insert will be more firmly embedded in the thread grooves of the boss; and the pointed ends 16, 17 will bite into the softer material of the boss owing to the bends 14, 15 being forced outward, whereby the insert will be securely anchored.

This may be accomplished with the tool according to the invention and illustrated in Figs. 3 to 5. The tool comprises a substantially tubular body 18 whose one end 19 is so shaped that a torque about its axis can be applied thereto. For this purpose, the end 19 of the embodiment of Fig. 3 is hexagonal so that a conventional wrench may be used in connection therewith. The other end 20 is provided with an external threading 21 of a pitch and diameter substantially corresponding to the pitch and interior diameter of the insert for which the tool is destined. Similarly, the shape of the threading 21 is preferably selected according to the cross-section of the insert wire. Hence, if e. g. the latter is round, the threading 21 should have a segment-shaped groove, and if the wire is diamond-shaped, the threading 21 should have a V-shaped groove as shown in Fig. 3. Thus, the end 20 of the tool can be easily screwed into a coil such as shown in Figs. 1 and 2 after the coil having been inserted in a boss. Body 18 is provided with a plurality of longitudinal slots 22 extending from the end 20 towards the other end 19 of the body. The length of the slots 22 should be so selected that the desired engagement of the end 20 can be obtained within the elastic limits of the material of the body 18. A flange or shoulder 23 is provided on body 18 in order to limit the depth to which the end 20 can be screwed into the wire insert. In certain instances it is advisable to apply a washer 24 to the flange 23. This washer is shown in Fig. 3 as a flanged ring with a spring ring 25 embedded therein and overlapping the flange 23 in order to prevent loss of the washer by inadvertence. The inner bore 26 of body 18 is cylindrical over its major portion. Near the body end 20, however, the bore has two oppositely directed conical faces 27 and 28.

Interiorly of the bore 26 and guided therein is a tubular plunger 29 movable lengthwise and having an end 20 with a taper corresponding to the cone of the face 27 and in engagement therewith. At the other end of the plunger 29 a cap 31 is provided with a central bore 32 of a diameter equal to that of the plunger. Although in the drawing cap 31 and plunger 29 are shown as separate pieces, it will be understood that they may consist of one piece only. A bolt 33 is arranged interiorly of plunger 29 and its one end 34 projecting from the body end 20 is so threaded that a conical plug 35 slipped over the end 34 can bear against a nut 36 screwed on the end 34. Plug 35 has an angle of cone equal to that of the cone face 28 with which it is in engagement. The other end 37 of bolt 33 projects from the cap 31 and is shaped as an eye with a pivot pin 38 passed therethrough. A forked handle 39 is pivoted on that pin with the prongs 40, 41 of its forked portion. The contours 42 of the prongs adjacent to the cap 31 are cam shaped so that the distance of the axis of pin 38 from the cap 31 is shorter when the handle is axially extended as in Fig. 3 than such distance when the handle is tilted or turned through 90° about the pivot. Now it will be clear that by adjusting nut 36 it can be obtained that simultaneously plug 35 will be in engagement with face 28, cone 30 with face 27, and cam 42 with the surface of cap 31 while handle 39 is in the axial position of Fig. 3. If, then, handle 39 is tilted the cam action will urge the two cones 30 and 35 towards each other thereby expanding the end 20 of body 18 owing to their wedging effect on faces 27 and 28 respectively. Furthermore, by turning the nut 36 in the one or the other direction the maximum diameter to which the end 20 will be expanded by tilting handle 39 can be adjusted within certain limits.

Depending on the kind of member to which an insert is to be secured and/or its accessability from below or above, it will be preferable to use a tool which can be adjusted near its threaded end as shown in the embodment of Fig. 3, or near its handle-provided end, as it is the case in the second embodiment of my invention illustrated by Fig. 6. This tool has a body 118 with head 119, threaded end 120, flange or shoulder 123, slots 122, cylindrical bore 126 and cone faces 127 and 128, all substantially like the equivalent parts whose reference numbers are lowered by one hundred in the tool shown in Fig. 3. The washer 24 of the last-mentioned tool has been omitted in Fig. 6 because it has been found that its presence is of advantage only in certain cases. A tubular member or plunger 129 is inserted in the body 118 so as to engage with its one tapered end the cone face 127. A longitudinal groove 150 is provided in the cylindrical portion of member 129, and a pin 151 secured in the head 119 of body 118 and projecting into the bore 126 engages said groove thereby permitting relative axial movement without relative rotation of body 118 and member 129. The latter is provided with a cup-shaped head 152 open towards the handle of the tool and interiorly threaded at 153. A cap screw 154 engages the threading 153. In the embodiment of Fig. 6 the cap screw consists of a hollow stud portion 155 with an external threading and a flanged shell portion 156 secured to the stud portion, e. g. by a pin 157. The shell 156 may be knurled as shown at 158, and may be provided with a gradation or scale 159 readable opposite a mark 160 on the head 152 of member 129 in order to facilitate the correct adjustment of the tool. A bolt 133 similar to bolt 33 of Fig. 3 is passed through the bore of the stud portion 155 of cap member 154 and through plunger 129. The bolt is provided with an eye 137 at its one end and carries a cone-shaped plug 135 at its other end. The plug 135 bears against a washer 161 which is retained by a pin 162 secured to the bolt 133. A handle 39 with cam face 42 is pivoted on a pin 38 passing the eye 137 in the same manner as described with reference to Fig. 3.

Fig. 7 shows a modification of the tool of Fig. 6. In this modification, body 218 which in other respects is equivalent to body 118 has a cylindrical extension 220 of the hexagonal portion 219. The tubular plunger 229 axially movable in body 218 is provided with a longitudinal groove 250 for engagement with pin 251, and projects with an externally threaded end 252 from the extension 220. A cap screw 254 engages the threading at 252. It is knurled at 258 and encompasses with its beveled and scale-provided rim 259 the extension 220 which carries the mark 260. Since the plunger is prevented from rotation in body 218, the effective length of the plunger will be indicated by the relative position of mark 260 opposite the scale on rim 259 provided the plunger is shifted to the right-hand side in Fig. 7 without expanding the body 218. Rod 133 axially movable in plunger 229 is passed through the bottom of the cap screw 254 and is provided with a cam handle 39 in the same manner as described in connection with Fig. 6. In other respects, the tools of Figs. 6 and 7 are alike, and it will be clear that they serve the same purpose and are operative in a like manner.

The tool according to the invention may be used in the following manner:

After the insert of the type shown in Figs. 1 and 2 is inserted in a boss or nut, the tool with the handle in axial position is screwed into the insert, the nut 36 of the tool of Fig. 3 or the cap screw 154 in Fig. 6 being so adjusted that little resistance is encountered in this operation. The depth to which the threaded end may enter the insert is limited by the body shoulder 23 or 123 with or without a washer 24. Then, the handle 39 is tilted whereby the two cones are pulled towards each other to effect a wedging action against the conical faces 27, 28 or 127, 128 with the result that the slotted tool body will be expanded. Owing to such expansion, the bends 14 and 15 of the insert will be pressed outward and the pointed ends 16, 17 will be forced into the material of the boss or nut. When the tool is expanded beyond the rate where the bends have the same inner diameter as the coil convolutions, the latter will also be expanded and tightly pressed into the thread grooves of the boss or nut. If a first expansion is insufficient to embed the insert convolutions and/or points 14 and 15 deep enough in the boss, the handle may be restored to its original axial position and the nut 36 or cap 154 may be so adjusted that the threaded tool end fits the insert which had been widened owing to the first operation of the tool. If, then, the handle is again tilted additional internal pressure will be exercised on the insert whereby the latter will be deeper embedded in the boss or nut thread. After the completion of the expanding operation the handle will be returned to its original position whereupon the tool can be easily screwed out of the insert.

In the foregoing, the tool according to the invention has been described in its application to inserts whose ends must be anchored in the boss or nut in order to prevent shifting of the insert when a tight fitting stud or like member is being screwed in. However, even with inserts of the type described in the above-mentioned Patent No. 2,150,876 where no anchors are required owing to the fact that the insert shape and wire cross-section insures immovability of the insert relatively to the boss in view of the friction between insert and boss being greater than between insert and stud, the expansion of the insert subsequent to its insertion is highly advantageous. If the insert is firmly seated and forced by the tool against the thread surfaces in a radial direction there will occur simultaneously a compression of the thread convolutions of the boss which renders the material of such convolutions, particularly if it is a soft metal, stronger and more resistant to the stresses to which the threading is subjected in use. Also, better heat transfer characteristics are secured which is of great importance if the insert is used in an assembly as, e. g. that of a spark plug and cylinder head. Furthermore, the expanding tool owing to its adjustment feature is useful to control the pitch diameter or size of the tapped hole with assembled insert. Similarly, the tool permits the use of undersized taps by expanding the hole with assembled insert to the finished thread pitch diameter and thus avoids the current difficulty of occasionally tapping work oversize, which difficulty hitherto existed in practise due to the wide range of machining characteristics of aluminum castings and forgings. Finally, the use of the tool permits an increase in the range of tapped thread tolerances, simultaneously allowing greater variations in minimum thread sizes because the finished thread with assembled insert can be expanded to size.

It will be understood that various changes in the specific form of my novel tool may be made without departing from my invention which is not limited by the particular disclosure of the embodiments thereof illustrated and described hereinabove but by the scope of the appended claims.

I claim:

1. A tool for securing a wire coil insert in the internal threading of a tapped hole, comprising a substantially tubular body having one end longitudinally slotted and provided with an external screw threading substantially corresponding to the internal shape of the insert for which the tool is destined, the slotted portion of said body being provided with two internal oppositely tapering cone faces, a tubular member interiorly of said body and having one end tapered and in engagement with one of said cone faces and its other end projecting from said body, a rod member including a cone-shaped, plug-like end in engagement with the other cone face of said body, one of said members being composed of two parts provided with interengaging screw threads whereby the active length of said member is adjustably variable, and cam means pivoted to the other end of said rod and in engagement with said tubular member so as to urge said plug and said tapered end of the tubular member against the respective cone faces of said body.

2. A tool for securing a wire coil insert in the internal threading of a tapped hole, comprising a substantially tubular body having one end longitudinally slotted and provided with an external screw threading substantially corresponding to the internal shape of the insert for which the tool is destined, the slotted portion of said body being provided with two internal oppositely tapering cone faces, a hollow plunger axially movable in said body, said plunger having one of its ends tapered and in engagement with one of said cone faces of said body, the other end of said plunger including means to adjustably vary the length of said plunger, a rod longitudinally movable within said plunger, a conical plug secured to the one end of said rod and engaging the other cone face of said body, and a cam mechanism in operative relation to said plunger and said rod for shifting them in axial direction relatively to each other.

3. A tool as claimed in claim 2, wherein said plunger comprises a cup-shaped head projecting from said tool body and threaded internally, and a cap screw in engagement with said internal threading, said cap screw having a central bore for the passage of said rod, and markings on said plunger head and said cap screw to indicate their relative adjustment.

4. A tool as claimed in claim 2, wherein said other end of the plunger projects from said tubular body, and said means comprise an external threading of said other plunger end and a cap screw engaging said threading and being provided with a hole of its bottom through which said rod is passed, and with markings opposite said tubular body to indicate the effective length of said plunger.

JAMES B. HOOD.